Sept. 13, 1927. 1,642,482
R. BERNHARD
SUPPORTING FRAME FOR BEARINGS
Filed March 14, 1927 2 Sheets-Sheet 1
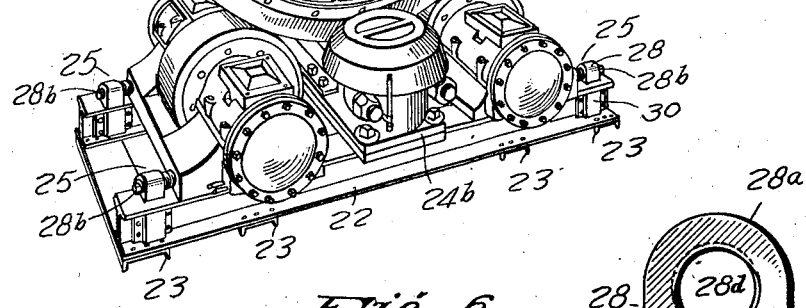
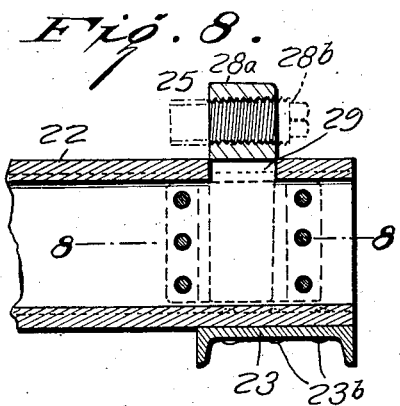
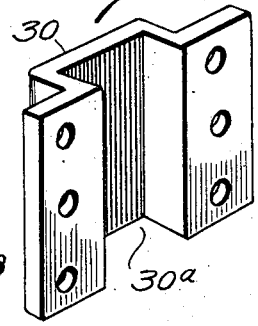
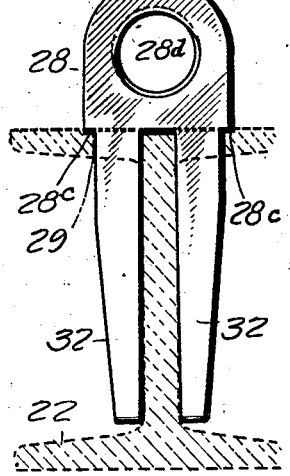
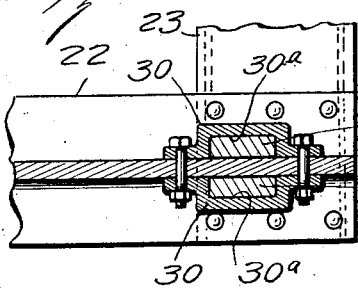
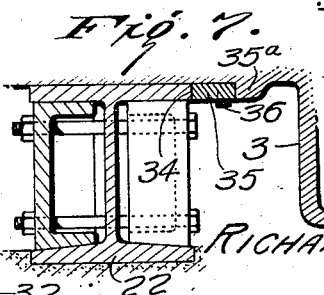
Inventor
RICHARD BERNHARD,
By Spear, Middleton, Donaldson, & Hall
Attorneys Sept. 13, 1927. 1,642,482
R. BERNHARD
SUPPORTING FRAME FOR BEARINGS
Filed March 14, 1927  2 Sheets-Sheet 2
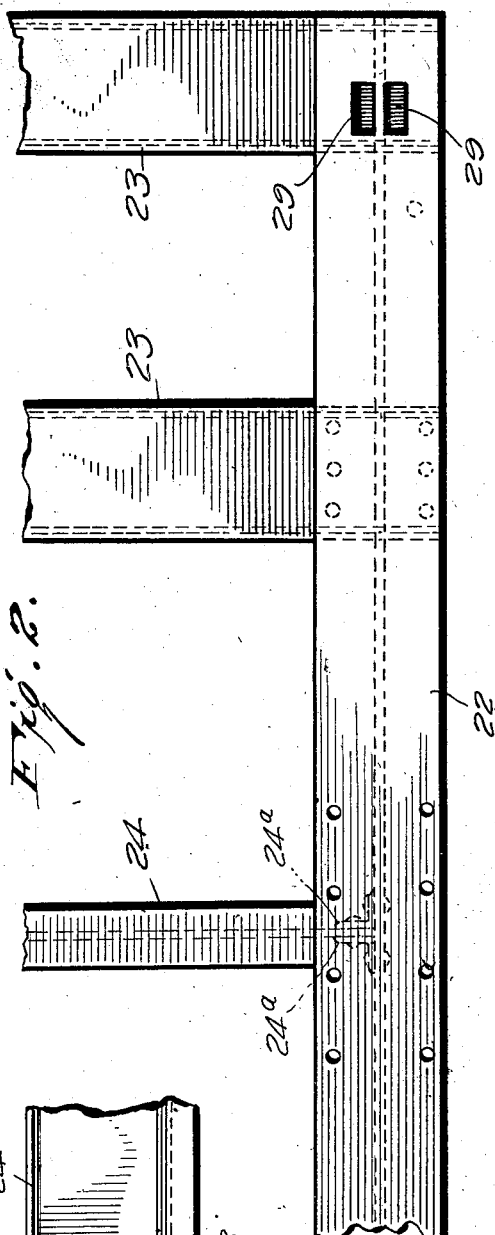
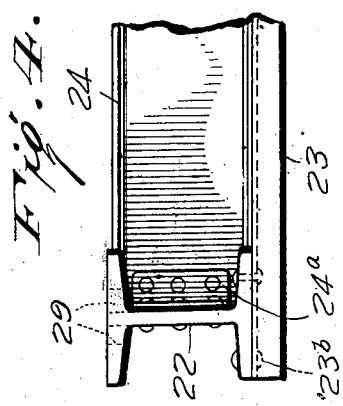
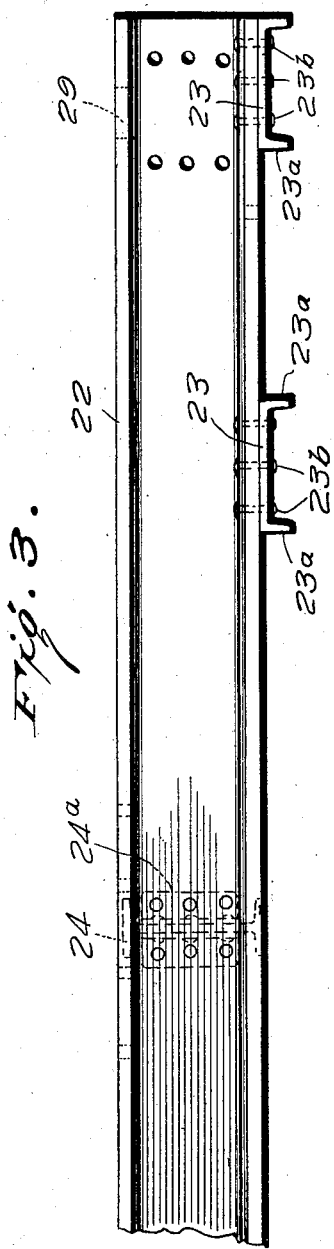
Inventor
RICHARD BERNHARD
By Spear, Middleton, Donaldson, & Hall
Attorneys Patented Sept. 13, 1927.

1,642,482

UNITED STATES PATENT OFFICE.

RICHARD BERNHARD, OF ALLENTOWN, PENNSYLVANIA, ASSIGNOR TO TRAYLOR ENGINEERING & MANUFACTURING COMPANY, OF ALLENTOWN, PENNSYLVANIA, A CORPORATION OF DELAWARE.

SUPPORTING FRAME FOR BEARINGS.

Application filed March 14, 1927. Serial No. 175,370.

This invention relates to improvements in a structural frame for supporting bearings and more particularly it relates to a supporting frame construction for the supporting rollers and their bearings for rotary kilns and the like.

An object of the invention is to provide a structural frame adapted to withstand the enormous vertical pressure of the kiln shell in addition to the weight of the rollers and their bearings, and to withstand the enormous lateral thrust imparted by the rotating kiln to the thrust rollers.

The invention consists in the features, combination and arrangement of parts hereinafter described and particularly pointed out in the claims.

In the drawings,

Figure 1 shows the entire assembly including the structural steel frame carrying the rollers and their bearings and showing the tire of the kiln shell in contact with the rollers.

Fig. 2 is a plan view of the frame.

Fig. 3 is a side view of the frame.

Fig. 4 is an end view of the frame.

Fig. 5 is a view of locking lug.

Fig. 6 is a view of the lug bracket.

Fig. 7 is a sectional detail view of the device for adjusting the bearings transversely of the girders.

Figs. 8 and 9 are sectional views of the locking device in position on the girder.

Referring to the drawings 22 represents the heavy rolled steel girders which are securely tied together by means of channel bars 23 and I-beam 24 forming a very strong support for the four bearings. The entire structure is adapted to be embedded in concrete so that the upper flange of the girder is not subjected to any stresses which might deflect it, as the load is taken by the concrete. The embedding also prevents shifting of the frame on the foundation.

The girders 22 are tied together at each of their ends by a pair of spaced channel bars 23, the flanges 23ª of which are disposed downwardly to be embedded in the concrete to prevent any longitudinal shifting of the frame induced by the motion of the rotating kiln shell. The channel webs are riveted to the girder flanges as shown at 23ᵇ.

Where no thrust rollers are to be supported by the frame, as at points distant from the center of the kiln shell the frame is provided with an I-beam 24 tying the girders together at their mid-points. The I-beam web is tied to the web of the girder by the angles 24ª. Where the thrust roller frame 24ᵇ is also carried by the structural frame the I-beam 24 is omitted, the thrust roller frame 24ᵇ taking its place.

The frame in addition to its novel construction of girders channels and I-beam is provided with bearing adjusting or locking screw device 25. The bearings must be aligned after they are set on the frames in order to make the rollers come in proper contact with the kiln shell tire 26, and also to maintain the shell in correct position for the driving gear. It is also necessary to adjust the bearings from time to time to compensate for wear in the bearing liners, supporting rollers and in the tires of the kiln shell and also for possible settlement in the foundation.

This adjustment of the bearings longitudinally of the girders, so that the bearing rollers may be moved toward or away from each other, is accomplished by the screw device 25. Each end of each girder is provided with a pair of holes 29 in the upper flange, one hole on each side of the web. A plug 28, such as shown in Fig. 5, has a head 28ª which has prongs 32 depending therefrom and adapted to straddle the web of the girder, said prongs being adapted to be inserted in the holes 29, one prong on each side of the web of the girder. The plug 28 is provided with a screw threaded bore 28ª to receive a set screw 28ᵇ which set screw is adapted to engage the bearing box. Flanges 28ᶜ are provided on the plug 28 which are adapted to rest upon the top flange of the girder. Steel castings or brackets such as shown at 30 in Fig. 6 are riveted to the web of the girder to form pockets 30ª to slidably receive the prongs 32 of the plug 28 and to prevent undue movement of the plug and hold it steady.

By means of the plug and set screw the bearing may be adjusted to and retained in the desired position. The plug with the screw may be removed by lifting the plug out as soon as the pressure is relieved. When the plug is removed it is possible to slide the bearings with the roller from underneath the kiln so that the roller may be lifted out and necessary repairs made.

By this novel means of construction the girders are not weakened to any appreciable extent by the holes 29 because the full strength of the web is retained. The holes 29 and the forked form of the plug 28 enables the web to be straddled and its strength unaltered.

It may be necessary to adjust the rollers and their bearings transversely of the girders 22 in order to align the rollers with the tires of the kiln shell due either to inaccuracy in the construction of the shell or inaccuracy in placing the girders in the foundation.

The rollers and bearings are rendered adjustable longitudinally of the axis of the kiln shell or of the axis of the roller shaft by replacing the shim plates 33 shown in Fig. 7 by wider or more narrow plates. These plates 33 abut against the girder 22 of the structural supporting frame on the one side as at 34 and on the other side as at 35 they abut against a lug 35ª cast integral with the bearing box 3. Changing the width of shim plates 33 thus provides the desired adjustment. The plates are held in place by small bolts 36 which secure the plates to the bearing members.

I claim:

1. A structural frame for supporting the supporting rollers and thrust rollers and their bearing for rotary kilns or the like, comprising a pair of spaced rolled steel girders of I-formation, each girder having a pair of holes in each end thereof, one hole on each side of the girder web, channel bars connecting the ends of the girders and having their webs secured to the lower flanges of the girders and their flanges extending downwardly to be embedded in concrete, an I-beam connecting the webs of the girders centrally thereof, and bearing adjusting means adapted to be inserted in said holes and to engage said bearings.

2. A structural frame for supporting the supporting rollers and their bearings for rotary kilns or the like, comprising a pair of spaced rolled steel girders of I-formation, each girder having a pair of holes in each end thereof, one hole on each side of the girder web, channel bars connecting the ends of the girders and having their webs secured to the lower flanges of the girders and their flanges extending downwardly to be embedded in concrete, and bearing adjusting means adapted to be inserted in said holes and to engage said bearings.

3. Apparatus according to claim 2 in which said adjusting means comprises a forked plug having a pair of depending prongs adapted to straddle the girder web and to be removably inserted in said holes, said plug having flanges adapted to rest on the upper flange of the girder, said plug being provided with a screw threaded bore in its upper end disposed at right angles to said prongs, a set screw adapted to engage the threads of the bore and to contact with a bearing to adjust it and to hold it in adjusted position, and pocket forming brackets secured to the girder web on each side thereof beneath each hole to form pockets to slidably receive the said prongs to steady the plug.

4. In a structural supporting frame, a girder of I-formation having a pair of holes in the upper flange thereof, one hole on each side of the girder web, a forked plug having a pair of depending prongs adapted to straddle the girder web and to be removably inserted in said holes, said plug having flanges adapted to rest on the upper flange of the girder, said plug being provided with a screw-threaded set screw receiving bore in its upper end disposed at right angles to the plane of said prongs, a set screw having threaded engagement with said bore, and means for steadying said plug in position.

5. Apparatus according to claim 4 in which the steadying means comprises pocket forming brackets secured to the girder web, one beneath each hole to slidably receive the said prongs.

In testimony whereof I affix my signature.

RICHARD BERNHARD.